Aug. 30, 1949.　　　C. B. DE VLIEG　　　2,480,807
METHOD OF AND APPARATUS FOR
MAKING IMPELLER WHEELS
Filed Nov. 18, 1944　　　12 Sheets-Sheet 1
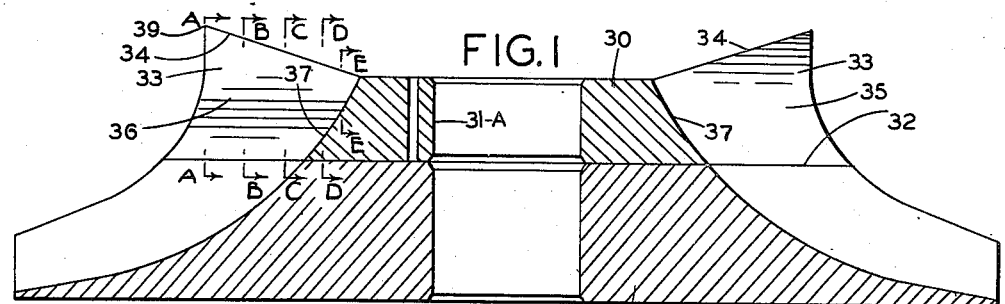
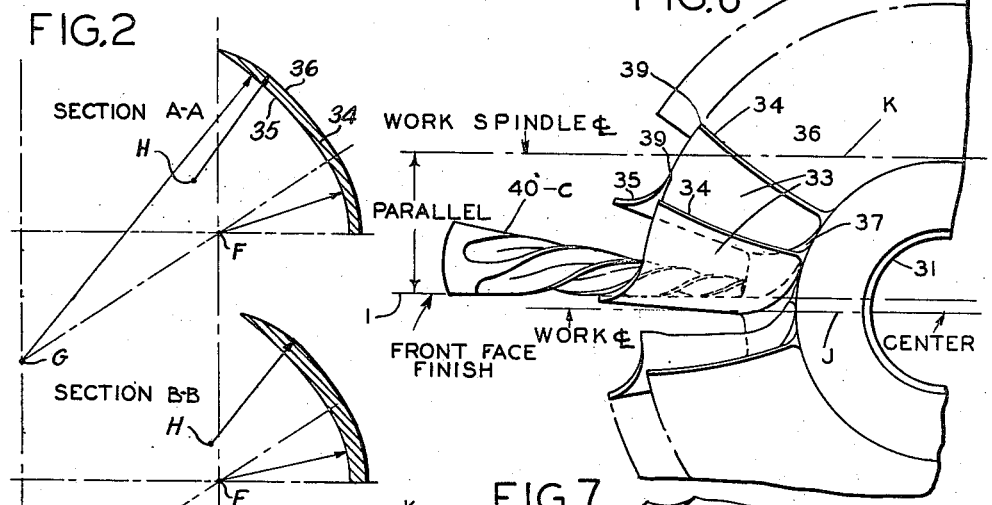
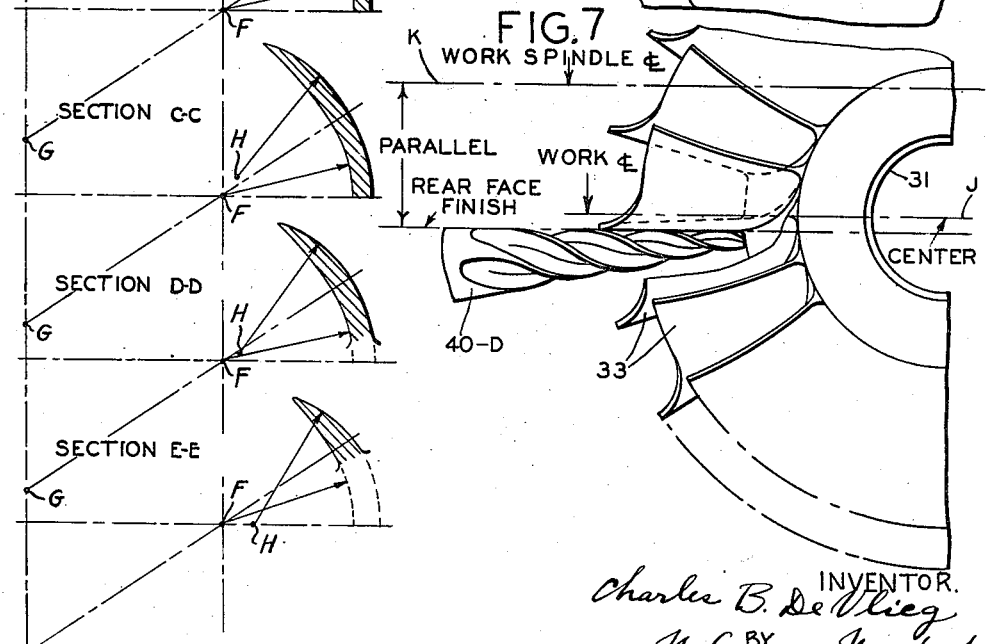
INVENTOR.
Charles B. De Vlieg
BY McCanna & Morsbach
ATTORNEYS Aug. 30, 1949.  C. B. DE VLIEG  2,480,807
METHOD OF AND APPARATUS FOR
MAKING IMPELLER WHEELS
Filed Nov. 18, 1944  12 Sheets-Sheet 2
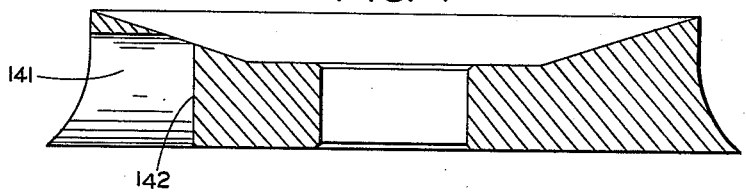
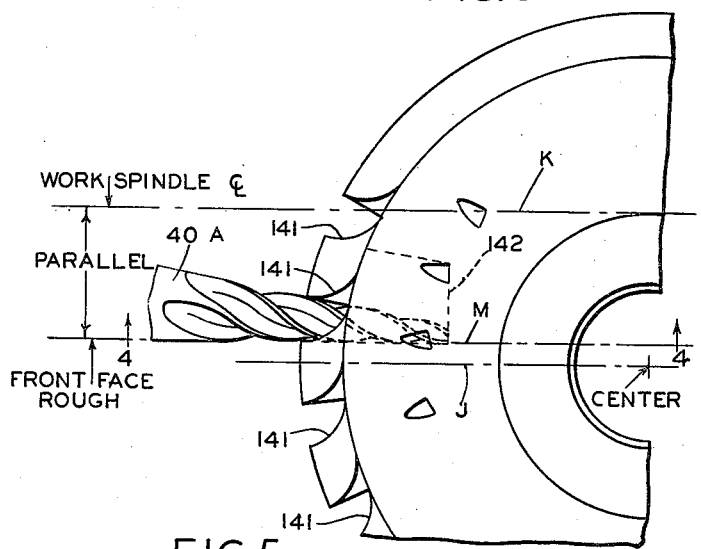
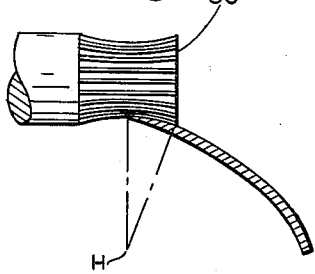
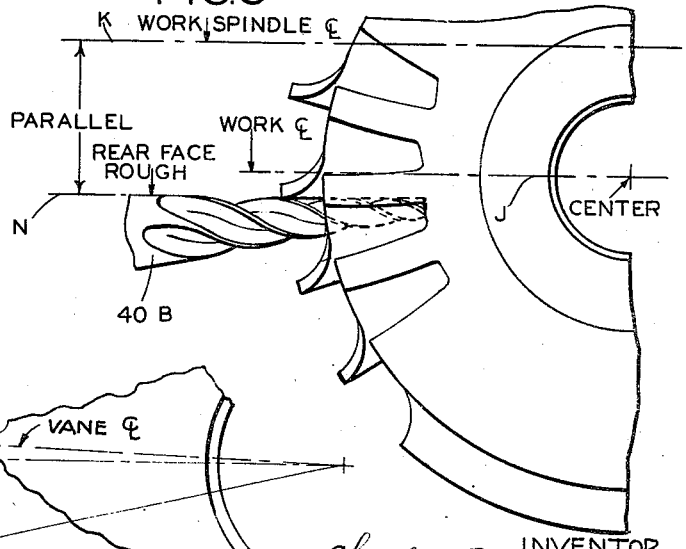
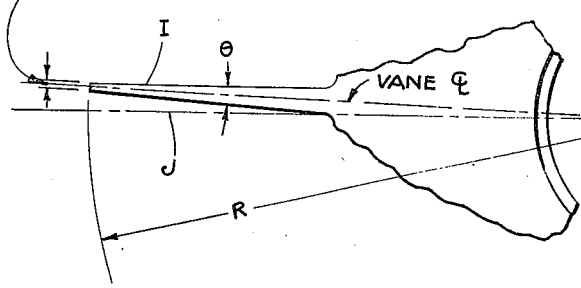

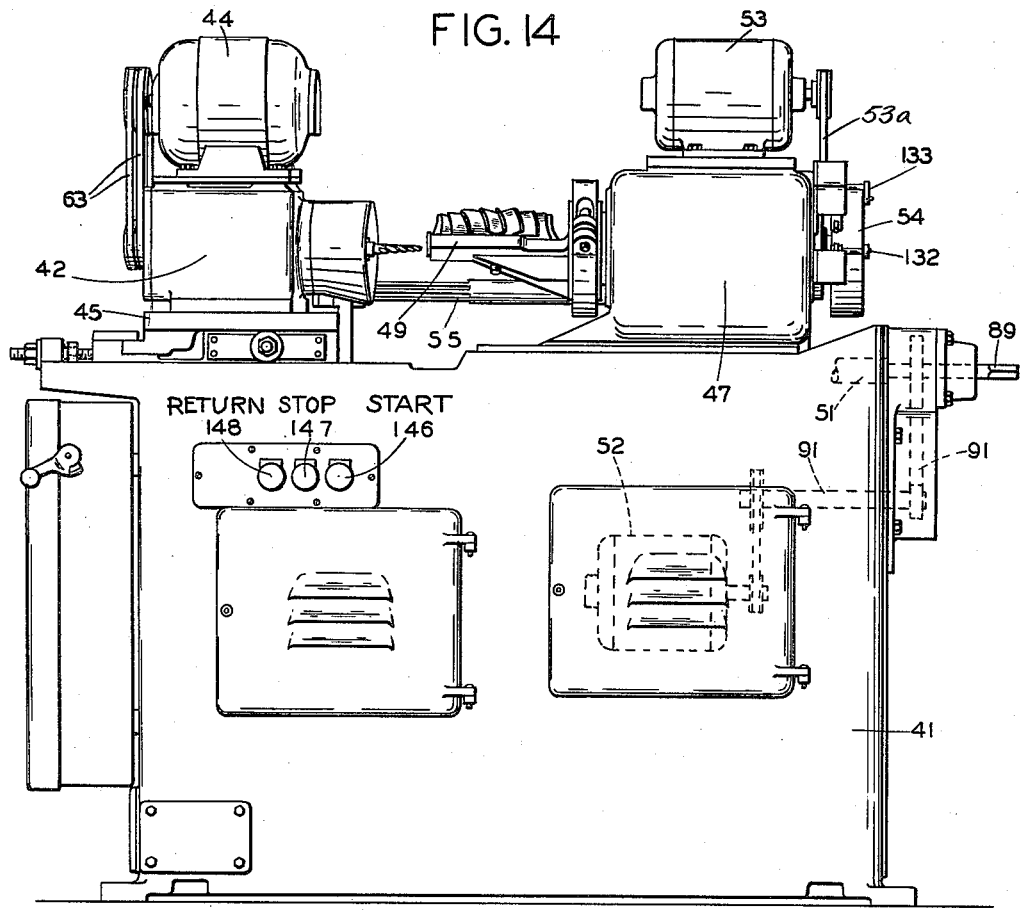
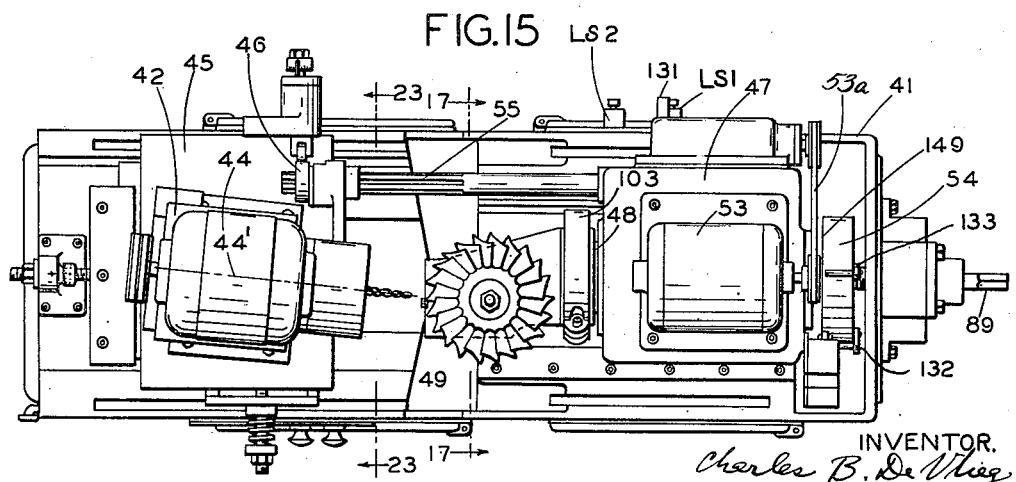

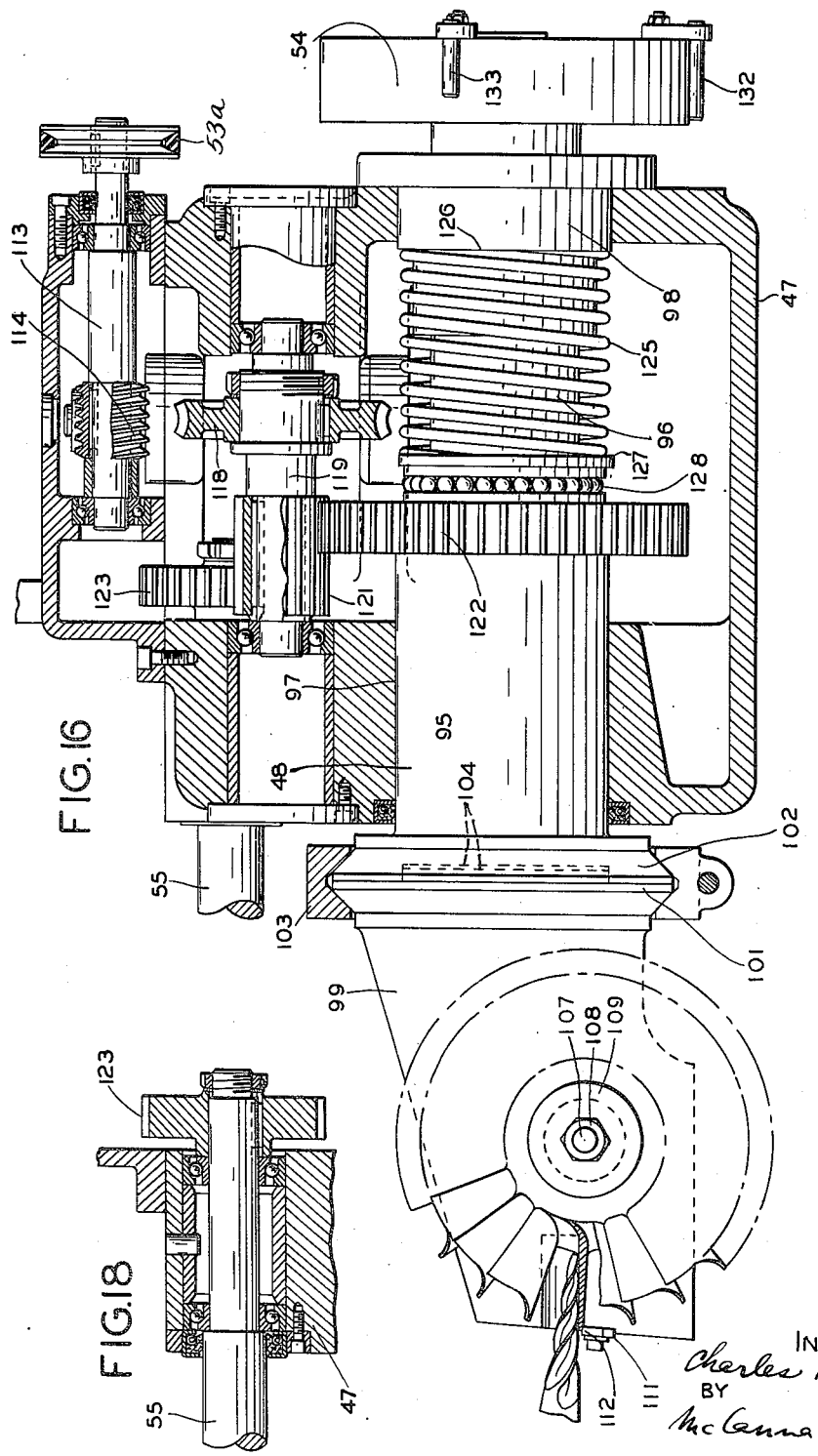

Aug. 30, 1949.  C. B. DE VLIEG  2,480,807
METHOD OF AND APPARATUS FOR
MAKING IMPELLER WHEELS
Filed Nov. 18, 1944  12 Sheets-Sheet 6
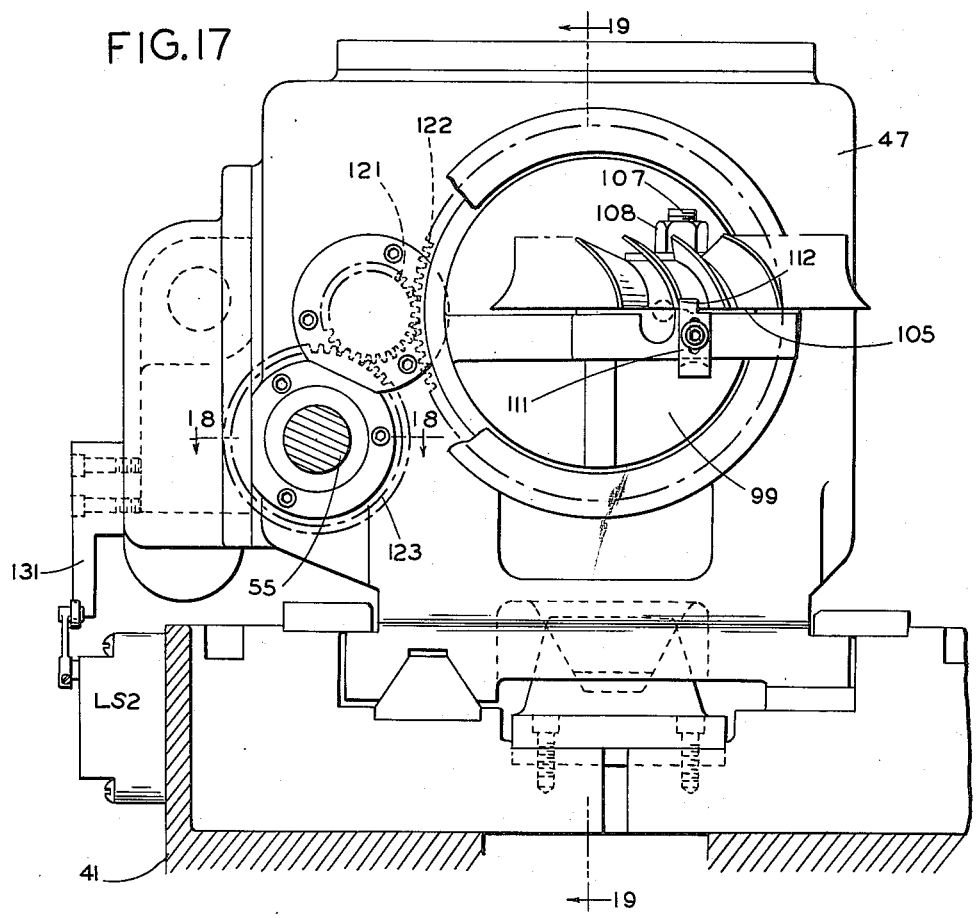
FIG. 17
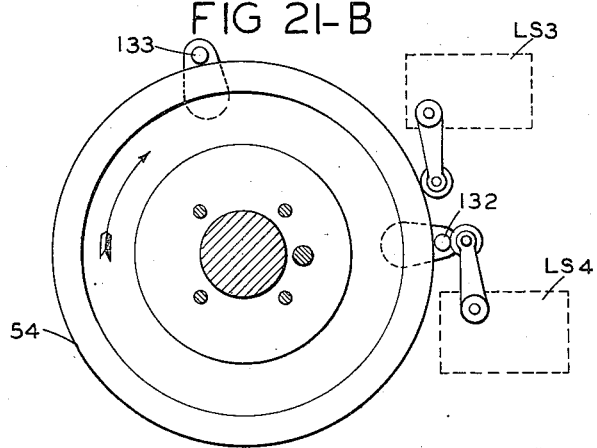
FIG 21-B
INVENTOR.
Charles B. De Vlieg
BY
McKenna & Morsbach
ATTORNEYS

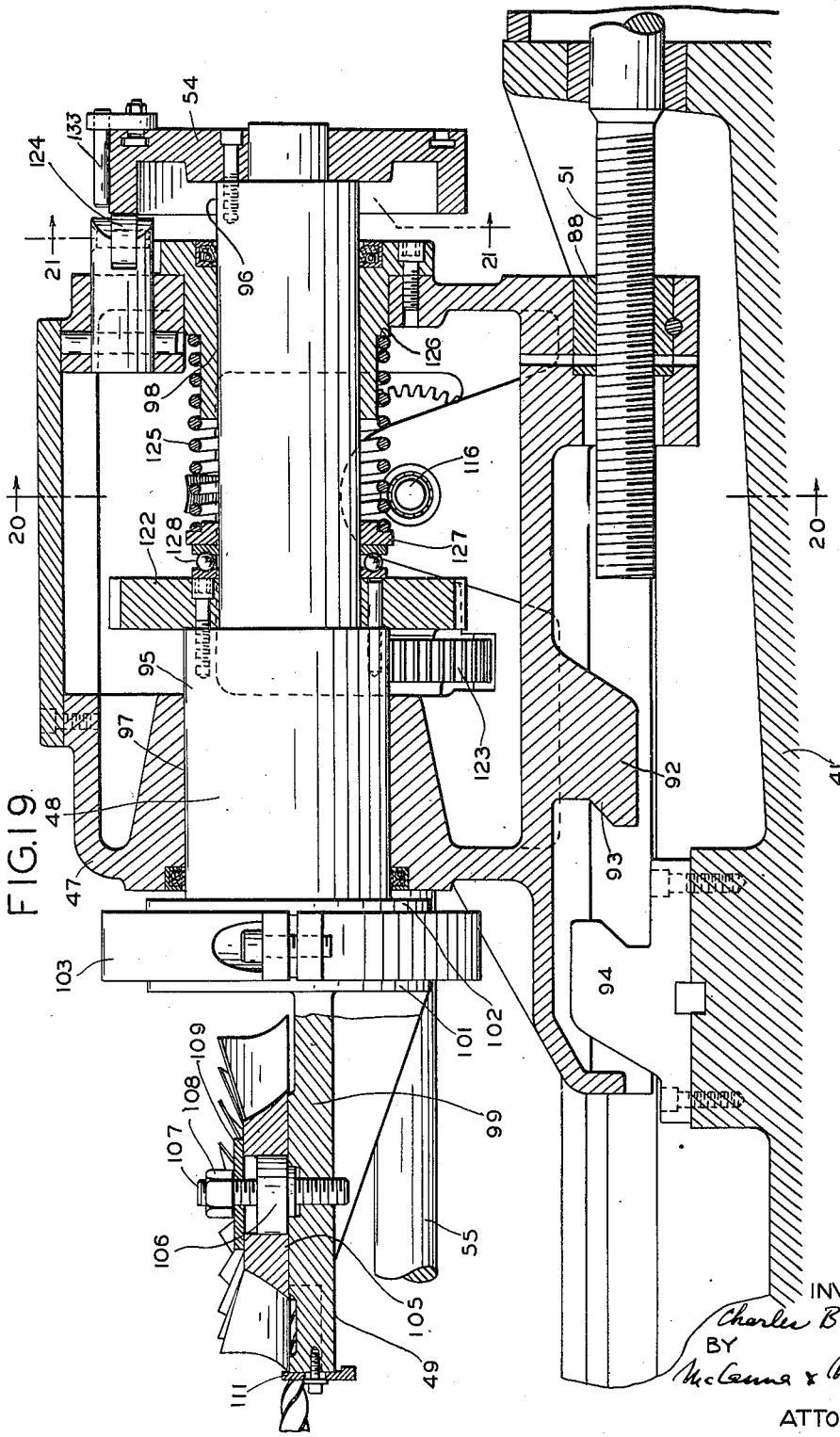

Aug. 30, 1949.  C. B. DE VLIEG  2,480,807
METHOD OF AND APPARATUS FOR
MAKING IMPELLER WHEELS
Filed Nov. 18, 1944  12 Sheets-Sheet 8
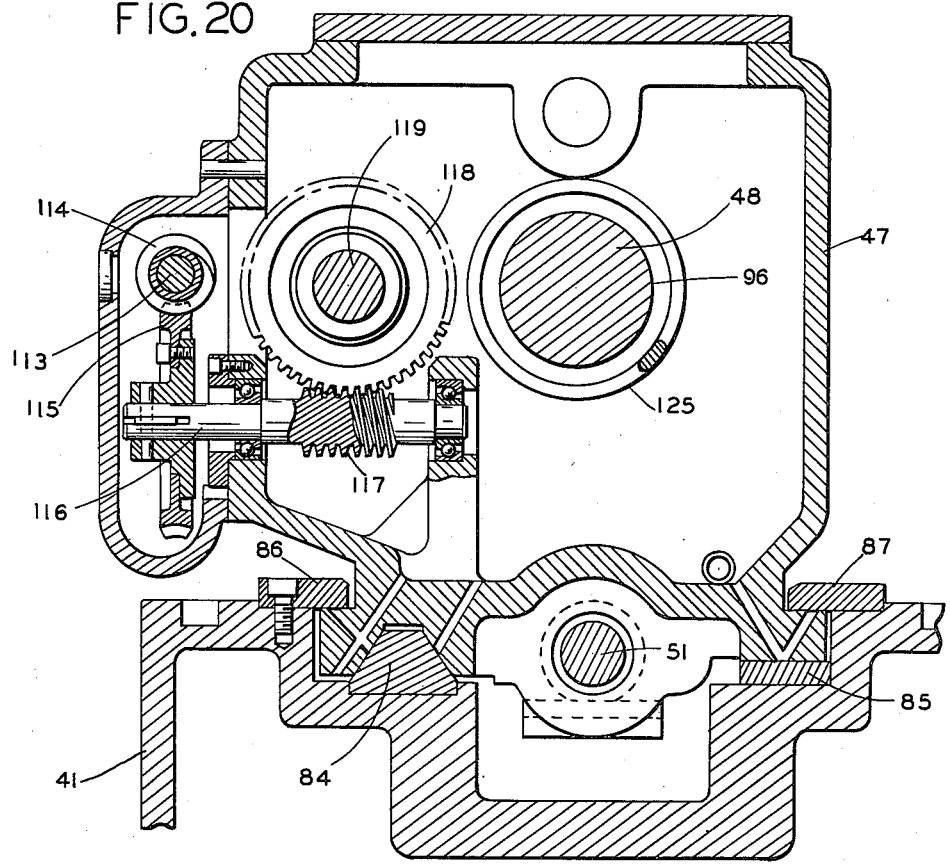
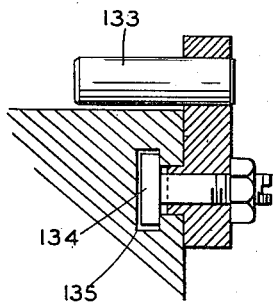
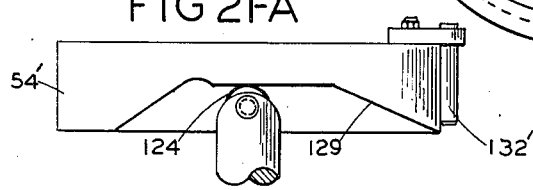
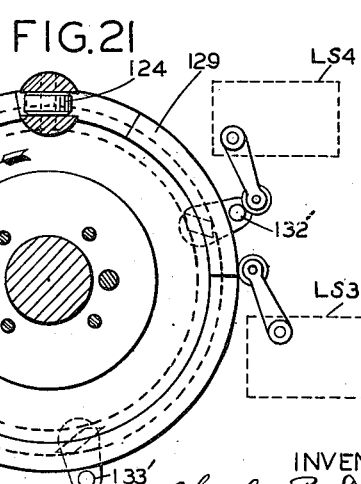
INVENTOR.
Charles B. De Vlieg
BY
McCanna & Morsbach
ATTORNEYS

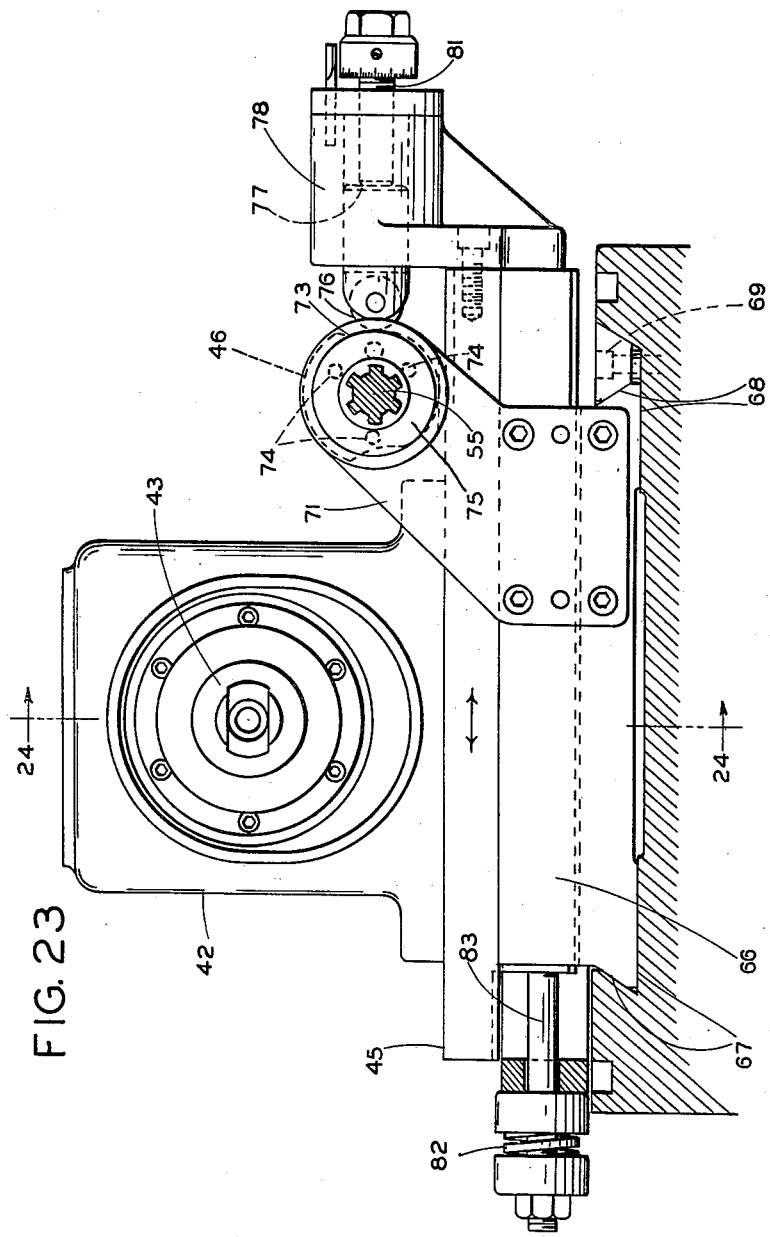

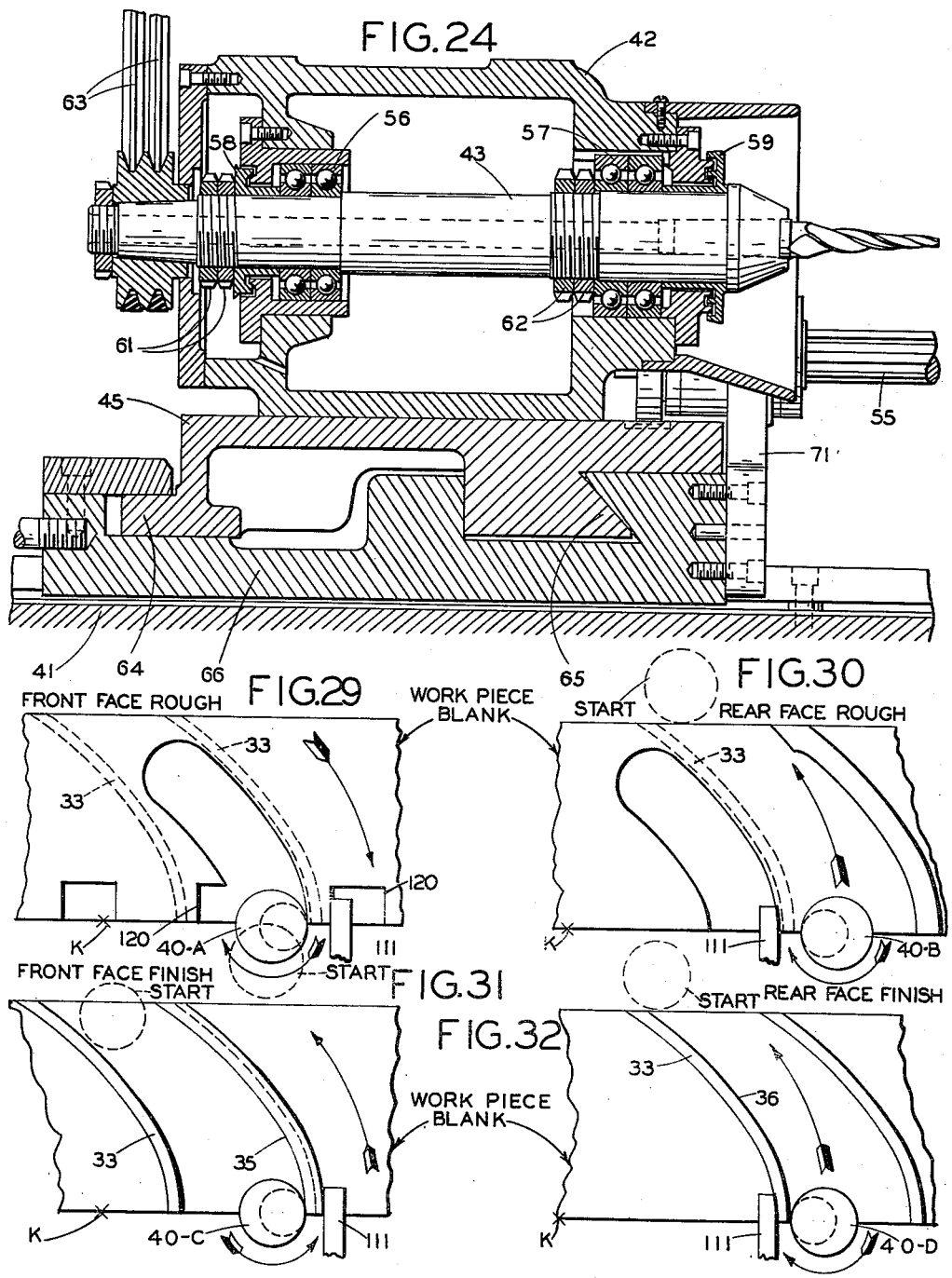

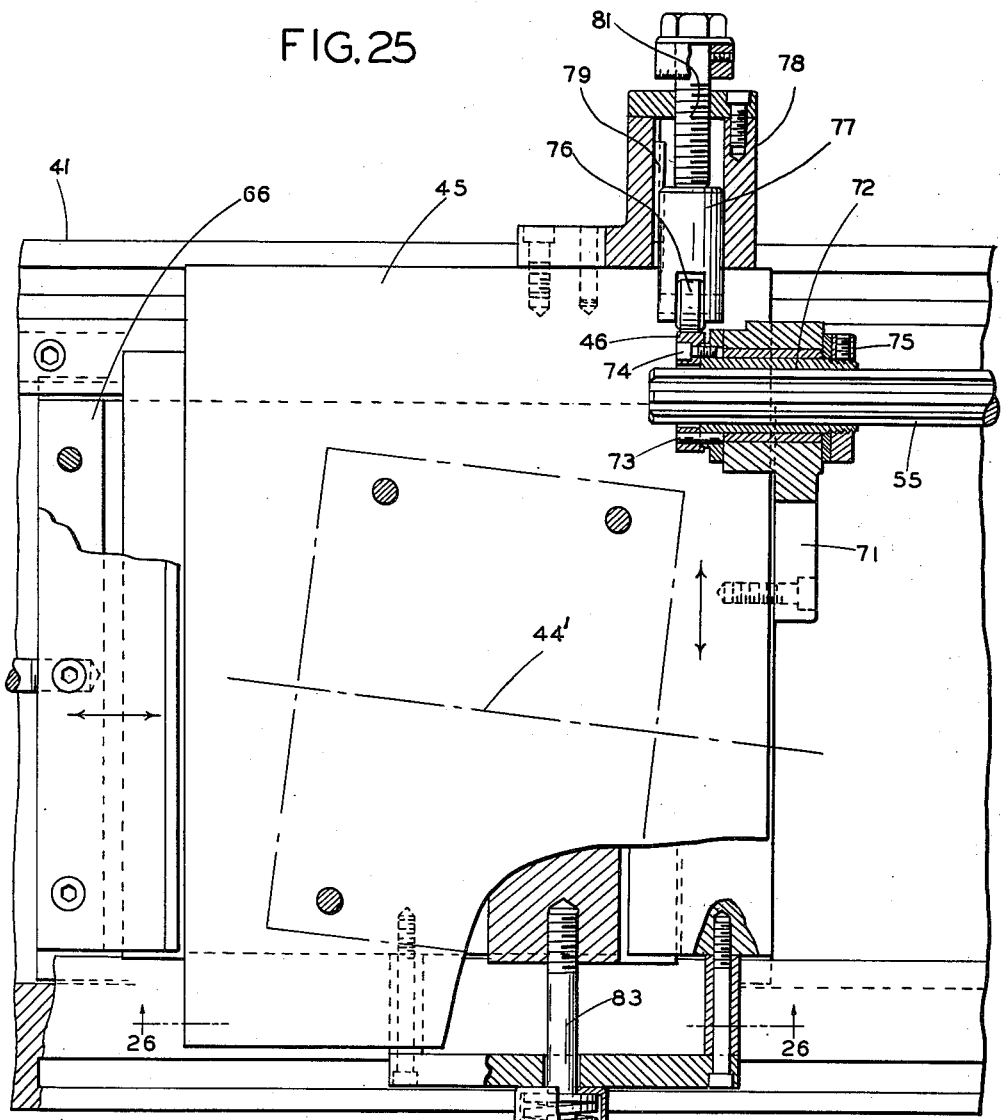

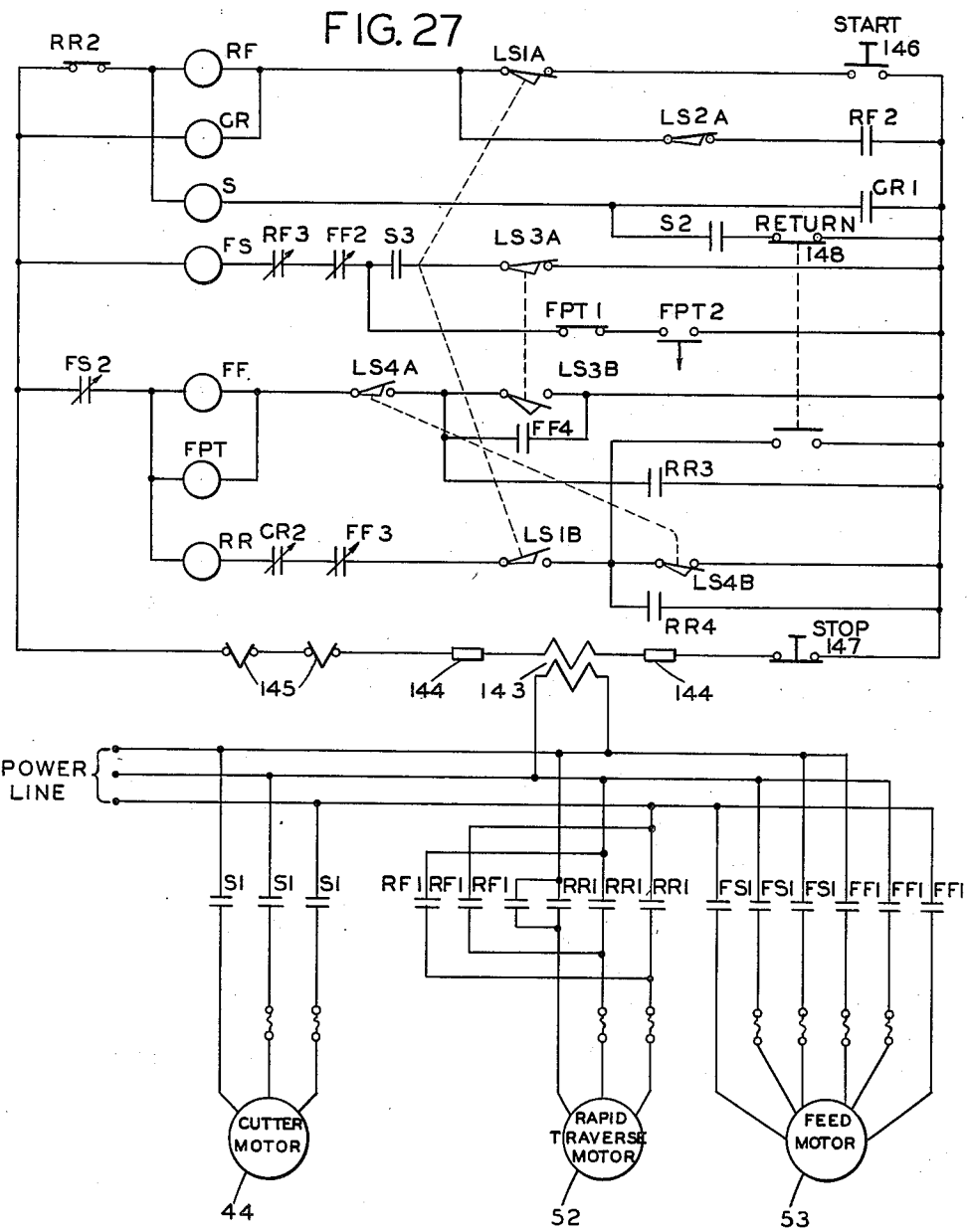

Patented Aug. 30, 1949

2,480,807

UNITED STATES PATENT OFFICE 2,480,807

METHOD OF AND APPARATUS FOR MAKING IMPELLER WHEELS

Charles B. De Vlieg, Birmingham, Mich., assignor, by mesne assignments, to Thompson Products, Inc., Cleveland, Ohio, a corporation of Ohio Application November 18, 1944, Serial No. 564,107

22 Claims. (Cl. 90—13.9)

1

This invention relates to metal working machines and has more particular reference to a method of and apparatus for making impeller wheels of different designs adapted for application generally in the field in which rotary impeller members are employed.

My invention is particularly adapted for making impeller wheels designed for supercharger applications. For example, in superchargers for aviation engines it is known to provide a composite impeller wheel composed of an inducer portion and an impeller or discharge portion each having closely positioned and registering vanes. The present application illustrates the invention as applied to the manufacture of such an inducer portion, but it should be understood that the invention is applicable to the manufacture of any impeller wheel whether composed of one or more members; and the term "impeller wheel" is, therefore, used in a broad sense without limitation to an inducer portion.

One of the objects of the invention is to provide an improved method of and apparatus for making impeller wheels.

Another object is to form the individual vanes of an impeller wheel by means of a succession of milling cuts characterized by the use of a tapered spiral cutter in a novel relationship to each vane structure and controlled so as to generate the desired surface shapes of the vanes in a manner promoting precision and economy in manufacture.

Another object is to provide a machine especially adapted for cutting by milling operations to a high degree of precision, predetermined intricate surfaces which compose the faces of an impeller vane, and to perform these operations automatically and in predetermined sequence so that upon starting the machine in operation as by actuation of a push button or its equivalent, the several functions are automatically performed and the machine returns to its starting position. According to the invention, this operation is repeated for milling a face of each vane structure in succession.

Another object is to provide an improved method for the generating of vane structures by means of milling operations, and contemplates an improved method of calculating and laying out cam movements whereby a vane structure of given design such as may involve intricate and compound curves, may be produced economically.

Another object is to provide an improved machine for making impeller wheels of the character described.

Still another object is to provide an improved

2 control mechanism for a machine of the character described.

Other objects and attendant advantages will be appreciated by those skilled in this art as the invention becomes better understood by reference to the following description when considered in connection with the accompanying drawings, in which—

Figure 1 is a section diametrically through a composite impeller wheel including an inducer portion the manufacture of which is carried out according to this invention;

Figure 2 is a series of detail cross sections taken substantially on the lines A—A, B—B, C—C, D—D, and E—E of Figure 1;

Figure 3 shows the relation of a cutter to the work piece blank in performing a first roughing cut on one side of a vane structure of the inducer portion;

Figure 4 is a diametrical section through the inducer portion taken substantially on the section line 4—4 of Figure 3;

Figure 5 is a view similar to Figure 3 but showing a cutter performing a second roughing cut on the opposite side of a vane structure;

Figures 6 and 7 are fragmentary face views of a finished inducer portion showing the position of a cutter with relation to a vane for finish milling the front side as in Figure 6 and the rear side as in Figure 7;

Figure 8 shows the relation of a special cutter in relation to a vane for milling the rear inlet edge;

Figure 10:
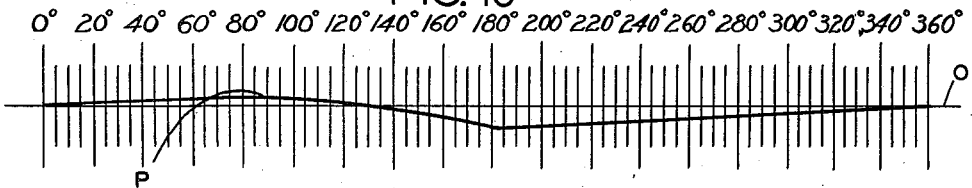

Figures 10, 11, 12, and 13 are diagrams showing the development of the cams employed in controlling the cutter movements;

Figure 14 is a front elevation of a milling machine embodying apparatus illustrative of the invention;

Figure 15 is a plan view of the machine;

Figure 16 is an enlarged horizontal section through the work head of the machine;

Figure 17 is a vertical cross section through the machine on a scale similar to Figure 16, taken substantially on the section line 17—17 of Figure 15;

Figure 18 is a detail section taken on the section line 18—18 of Figure 17;

Figure 19 is a vertical section taken substantially on the section line 19—19 of Figure 17 and showing a cutter positioned to full depth with relation to the impeller wheel as at the beginning of a milling operation;

Figure 20 is a cross section taken substantially on the section line 20—20 of Figure 19;

Figure 21 is a detail cross section taken substantially on the section line 21—21 of Figure 19, showing a cam and dog set-up used in a finish milling operation;

Figure 21—A is a plan view of the cam and roller shown in Figure 21;

Figure 21—B is a view similar to Figure 21 but showing a cam and dog set-up used in the first rough milling operation;

Figure 22 is an enlarged detail section of one of the trip dog mountings shown in Fig. 19;

Figure 23 is a cross section taken substantially on the section line 23—23 of Figure 15;

Figure 24 is a longitudinal section through the cutter head taken substantially on the section line 24—24 of Figure 23;

Figure 25 is an enlarged fragmentary plan view of the cutter head portion of the machine shown in Figure 15 but with the cutter head removed;

Figure 26 is a detail section taken on the section line 26—26 of Figure 25;

Figure 27 is a diagram of the electrical control for the machine;

Figure 28 is a diagram illustrating the method of locating the surface to be milled; and Figures 29, 30, 31, and 32 are diagrammatic views showing, respectively, the first roughing operation, the second roughing operation, the front face finish milling, and the rear face finish milling.

*Impeller wheel and milling operations*

My invention is herein illustrated in the manufacture of an impeller wheel member known as an "inducer portion" of a design shown in Figures 1, 2, and 6. The composite wheel is shown in Figure 1, comprising an entrance inducer portion 30 and an impeller portion 31 meeting end to end in a flush joint 32. The hub is centrally bored at 31 to be splined for fitting a spline shaft. The inducer portion has a plurality of relatively closely positioned vanes 33 designed to give a high degree of adiabatic efficiency. Each vane has an entrance edge 34 on an angle with respect to the flat face 32 and diverging outwardly from the hub portion, as shown in Figure 1. Each vane has a front face 35 and a rear face 36 and a similar curvature when viewed at cross-sections spaced lengthwise of the vane as shown in the several sections of Figure 2. The outlet edges of these faces along the joint 32 are flush with continuing edges of the vanes of the impeller portion 31. The root surface 37 follows a curve which extends along the root to the tip outlet of the vane on the impeller portion. The front face 35 of each vane 33 is on a compound radius comprising a short radius struck from the center F and a longer radius struck from the radius G, as shown in Figure 2. The rear face 36 follows substantially the same curvature. The rear face is tapered in cross-section substantially to an edge as by a curvature struck from the radius H, this curvature extending from the root end 37 to the tip end 39 of the vane 33.

According to my invention each front and rear face is formed by separate milling cutters, each operating in a separate machine set-up. I prefer to use tapered spiral milling cutters but a straight side cutter may be used. The tapered cutter provides greatly added strength which minimizes deflection at the inner end of the cutter. Each cutter operates in succession on the vane structures, each of which is positioned at a cutting station by indexing of the work piece blank from which inducer portion is to be formed. In the present case I employ roughing and finishing cutters comprising a front face roughing cutter 40—A, a rear face roughing cutter 40—B, a front face finishing cutter 40—C, a rear face finishing cutter 40—D. Mechanism is provided as described hereinafter to effect relative movement between each cutter and the work piece to generate the compound radius or curved surface of each face 35 and 36, in a particularly advantageous manner. For a preliminary understanding of the novel functions, reference may be had to Figures 6, 7, and 9. In Figure 6 the cutter 40—C is supported with its axis coplanar with the face 32 of the inducer member and with its cutting side coincident with a line or plane I which is parallel with and laterally offset from a line J which passes through the center of the inducer member. According to my invention the line I which is coincident with the vane surface to be milled, is parallel with the line J and spaced therefrom a distance determined as follows, referring to Figure 28: The thickness of the tip of the vane or blade to be milled is designated as $t$, the distance of said tip from the center by $R$, and the included angle of the taper of the blade as "theta" ($\theta$). The angular relation of line I to the center line of the blade is one-half the angle "theta." This would mean that the center line of the blade must have an angular relation of one-half "theta" to the center line J in order to have I parallel with J. The distance of the center line of the blade to line J at the radius $R$ can be determined by multiplying $R$ by the tangent of one-half "theta." This establishes the distance from line J to the center line of the blade and by adding one-half the thickness $t$, the distance from line I to line J is determined. This may be expressed by the formula:

$$\frac{1}{2}t + \left(\tan\frac{\theta}{2} \times R\right)$$

This is given as a working formula to illustrate the principle of establishing the position of the line I to conform with a previously determined taper of the vane to be milled. This is the basic relationship of the cutter to the work piece which is maintained while performing further functions comprising (1) rotative feed movement of the work piece about an axis K which is parallel with and laterally offset from the line J with K and J in a plane L (Figure 9) coplanar with the face 32 of the work piece, (2) feed movement of the milling cutter in said plane L in a predetermined relationship to an arc struck from the center K and simultaneously with said rotative feed movement whereby to generate the desired compound radius face of the vane or any determined face contour (the combined feed movements (1) and (2) producing the finished surface 35), and (3) feed movement parallel with the axis K and the cutting side I simultaneously with the described feed movements (1) and (2) to produce a root channel such as 37 of varying depth.

These functions may be performed with separate cutters in roughing and finishing operations and with variations according to the circumstances of the particular job or the design of the impeller work piece. In the case of an inducer portion of the design herein illustrated I have used a roughing cutter 40—A for the front face of the vane structure (Figures 3 and 29), a roughing cutter 40—B for the rear face (Figures 5 and 30), a finishing cutter 40—C for the front face (Figures 6 and 31), and a finishing cutter 40—D for the rear face (Figures 7 and 32). As shown in Figure 3 the cutter 40—A is positioned with its cutting side in the plane M intermediate K and J a distance sufficient to leave stock for finish milling the front face or surface 35. In this position the milling functions (1) and (2) are performed, omitting the function (3). This gives a gashing cut 141 through the solid stock conforming with the general contour of the front face of the ultimate vane but with the root channel edge 142 parallel with the axis of the work piece blank, as shown in Figure 4. This milling cut is terminated short of the opposite end of the blank due to the close spacing of the vanes. This milling operation is further illustrated in Figure 29, showing that the feed movement of the blank is clockwise around the center K. The blank is indexed to repeat this roughing cut for each vane structure. In the next machine set-up the second roughing cutter 40—B is set at the opposite side of the line J with its cutting side in the plane N parallel with J and offset therefrom a distance corresponding with the distance between planes J and M of Figure 3. This operation is further shown in Figure 30, in which the feed movement of the blank is counter-clockwise around the center K. This roughing cut is made in succession similarly to the first roughing cut. The next machine set-up is made with the work piece blank and the finish cutter 40—C as shown in Figure 6, previously described, and as further shown in Figure 31. This milling operation comprises the functions (1), (2), and (3) above described, and produces the finished front face 35 and the root channel 37 at the front of the vane. The next machine set-up is with the work piece blank and the cutter 40—D as shown in Figure 7 with the cutter at the side of the line J opposite from the line K, and as further shown in Figure 32. This milling operation performs the functions (1), (2), and (3). In these finish operations the blank has a feed movement counter-clockwise about the center K. In all operations the cutter rotates in a direction for "climb" milling. This completes the machining of the vanes, except for finishing the entrance edges 34 to a feather-like edge if this is desired. For this, a milling cutter 50 is used in the set-up shown in Figure 8, the profile of the cutter being designed to mill a convex surface such as struck from the center H abovementioned. This operation is preferably performed on a machine such as disclosed in my application Ser. No. 407,287, filed August 18, 1941, now U. S. Patent No. 2,390,994, granted December 18, 1945.

This preliminary explanation teaches certain basic functions contemplated by my invention and, as will be apparent from the further disclosure, means is provided whereby these functions or variations thereof may be automatically performed by milling operations to expeditiously and accurately obtain impeller wheels of different vane characteristics according to desired impeller specifications.

This invention is of particular utility because it provides a simple and practical method and apparatus for automatically performing the described milling functions. It also provides a novel method of calculating or designing cams to control the performance of the milling operations to the high degree of precision desired in the manufacture of impeller wheels. In this connection the invention contemplates the manufacture of impeller wheels of designs having single radius or compound radius vanes, also vanes of intricate face design which would be possible of manufacture within the teachings of this invention.

In the illustrative example the work piece blank is of aluminum and the roughing cutters are operated at about 3600 R. P. M. and the finish cutters at about 1200 R. P. M. In practice, magnesium and steel blanks have been used. However, the invention is not limited to materials or design of the impeller wheel or to the number or order of the milling operations and in some cases an intermediate milling operation such as semi-finish may be used. In actual practice I have obtained especially good results with the use of milling cutters of tapered spiral design ground in accordance with the invention disclosed in my application Ser. No. 535,055, filed May 11, 1944, now Patent No. 2,422,475, granted June 17, 1947.

*General machine assembly*

In this illustrative embodiment a machine is shown for automatically performing the described milling operations. In actual production manufacture one such machine will be provided for each milling operation, that is, each machine will have its own cutting tool set up and work fixture as will be presently more fully described; but it will be understood that if desired, these operations may be performed on the same machine by providing the proper tool and work set up and the controls therefor. Briefly, this machine comprises a suitable base designated generally by 41 which houses or supports the mechanism. On top of the base is mounted a cutter tool head designated generally by 42 in which is journalled a high speed cutter spindle 43 on a horizontal axis extending lengthwise of the base and adapted to be set in angular relation to the longitudinal axis of a work fixture spindle which will be presently described, this angular axis being indicated by the center line 44' in Figures 15 and 25. The cutter head is supported on a slide 45 which is mounted for horizontal movement transversely of the bed, this being a cutter feed movement effected by a rotative cam 46 as will be later described. On the opposite end of the bed is mounted a work head designated generally by 47 which is mounted to travel lengthwise on the bed toward and from the cutter and which carries a work spindle 48 on a horizontal axis parallel with the lengthwise movement of the head. This spindle is equipped at the end adjacent to the cutter with a work fixture 49 on which the impeller wheel blank is mounted. The work head is moved lengthwise by a feed screw 51 driven by a motor 52 in the base. The work spindle is moved rotatively by a gearing mechanism driven from a motor 53 to move the work piece in a feed movement in one direction and in a return movement in the opposite direction. Simultaneously with certain such rotative movements, the spindle is moved axially lengthwise in the work head or is held against such axial movement under control of a cam 54 on the end of the spindle opposite from its work fixture end, this being for the purpose of effecting taper milling of the root surface between adjoining vanes. The cam 54 used for the first roughing operation has a plain face so as not to move the fixture spindle axially and the cam 54' shown in Figures 21 and 21—A has an inclined face 129 to effect root milling operations when performing the operations shown in Figures 30, 31, and 32. The gearing mechanism referred to operates a cam shaft 55 which carries the described cam 46 and operates to impart crosswise feed movement to the cutter in timed relation to the rotative feed movement of the work spindle. These operations are automatically effected in predetermined sequence by electrical switch controls operated by forward and rearward movements of the work head and also by switch controls operated by forward and backward rotative movements of the work spindle cam 54, in a complete cycle of operations initiated by the pressing of a start button, as will be described more fully hereinafter.

Cutter mechanism

Referring more particularly to Figures 23, 24, 25, and 26 it will be observed that the cutter spindle 43 is mounted in suitable radial and end thrust bearings 56 and 57 suitable for high speed heavy duty milling operations. Suitable provision is made for lubrication including oil slinger structures 58 and 59 at opposite ends of the spindle mounting. Double lock nuts 61 and 62 are applied to maintain lengthwise precision in the mounting of the spindle. The spindle is directly driven through a V-belt drive 63 from a motor 44 which is mounted on top of the spindle head. This head is fixedly bolted to the slide 45 with capacity for adjustment on the slide angularly with respect to the work piece in order to properly adjust and set the cutter in the desired operative relation to the work. The slide is provided on its underside with horizontal flat ways 64 and bevel ways 65 extending from end to end and fitting in complemental ways on a saddle 66 which in turn is mounted on combination flat and bevel ways 67 and 68 for precision adjustment lengthwise on the bed. The saddle is locked in position on the bed by suitable means such as clamp screws 69. To one face of the saddle 66 is bolted a bracket 71 in which is journalled a sleeve 72 to one end of which is detachably fixed the cam 46 through means of a position locating pin 73 and bolts 74. A collar 75 on the opposite end of the sleeve 72 prevents lengthwise displacement thereof. This sleeve is splined internally to receive the splined end of the cam shaft 55. A roller 76 engages the periphery of the cam and is supported by a plunger 77 which in turn is supported for lengthwise adjustment in a suitable bracket 78 fixed to the slide 45 as best shown in Figure 23. The cam plunger is held by a key 79 against rotative displacement and is backed by a micrometer adjustment screw 81 for accurately positioning the cutter head with relation to the cam. A heavy compression spring 82 is applied through means of a bolt mounting 83 between the saddle 66 and the slide 45, as best shown in Figures 23 and 25, for the purpose of constantly urging the slide crosswise toward the front of the machine to maintain the roller 76 in contact with the cam 46. It will be evident that the cam roller will follow the cam surface under influence of the spring 82 and that upon rotative movement of the cam shaft 55 the cutter head will be moved crosswise in a precision feed movement according to the shape of the cam and the degree of rotative movement.

Work head mechanism

Referring to Figures 14 to 22, the work head 47 is mounted on suitable ways on top of the bed for movement horizontally toward and from the cutter head. As shown in Figure 20, these ways comprise a V-way 84, a flat way 85, and gib ways 86 and 87, all parallel with the feed screw 51 which engages in a nut member 88 fixed to the work head. The feed screw is adapted to be turned manually by application of a hand crank to the shaft end 89 or by power from the motor 52 through a drive train 91 including reduction gearing. The motor drive is preferably for rapid traverse of the work head forwardly (to the left viewing Figure 14) to move the work into operative relation to the cutter preparatory to starting the milling operation, and rapid traverse reverse to return the work head to a starting or at rest position. The motor 52 is started by the operator pressing a starting button which initiates the cycle of operations briefly described above.

Referring to Figure 19, the work head is provided on its underside with a positioning block 92 having a forwardly extending taper portion 93 adapted to engage a complementary stop block 94 rigid on the bed. The taper portions of the blocks are brought into interlocking engagement when the work head reaches the limit of its forward movement, thus rigidly clamping the head in this position. Reversal of the feed screw withdraws the block 92 from the block 94.

The work spindle 48 preferably has a large diameter portion 95 and a smaller diameter portion 96 journalled for rotative and lengthwise movement in bearings 97 and 98, respectively, in the work head casing, the bearing member 98 being removable from the rear end as will be obvious from Figure 19. The spindle is equipped at its forward end with a removable work fixture designated by 99 generally similar in principle and application to the spindle work fixture disclosed in my application Ser. No. 407,287, now Patent No. 2,390,994, granted December 18, 1945. The base end of the work fixture has integral therewith a large diameter flange element 101, Figure 16, which seats flat against a similar flange element 102 integral with the forward end of the spindle. These flange elements are tapered on their peripheries in diverging relation so that they may be rigidly clamped and locked one against the other by means of a split clamp collar element 103. The flange elements are held in precision alignment by male and female positioning members 104.

In this embodiment the work fixture provides a flat work supporting surface 105 in a plane parallel with the axis of the spindle as shown in Figure 19 and transverse to said axis so as to lie in a diametrical plane as shown in Figure 17. A center post 106 is provided on the work fixture, held in position by a center clamping bolt 107. A nut 108 threaded on the bolt 107 acts against a disk 109 to clamp the work piece in position on the work fixture. The work piece or block is adapted to be indexed about this center post to position each vane structure in succession at a milling position for the particular milling operation. Suitable means is provided for accurately locating each vane structure in said milling position, in this instance comprising a stop member 111 adjustably attached to the outer end of the work fixture and having a locating face 112 against which a face of the vane structure engages, as shown in Figures 17 and 19. The index stop member 111 is also shown in Figures 29, 30, 31, and 32. Each of these operations requires a separate work fixture to properly support the blank with respect to the cutter, and also requires an index stop member 111 shaped and located to accurately position the vane structures for each operation. For the first operation, notches 120 are milled in one edge of the blank to determine the vane structure locations, as shown by the index stop member 111 coacting with an index notch in Figure 29.

The power drive for imparting rotative movement to the spindle in one direction for feed of the work into the cutter and in the opposite direction for return of the work to a starting position is as follows: The motor 53 on top of the work head drives a worm shaft 113 (Figure 16) through a V-belt 53a. The worm 114 on this shaft meshes with a worm gear 115 (Figure 20) which is fixed to a cross-shaft 116, which carries a worm 117 which in turn is in mesh with a worm gear 118 fixed to an intermediate shaft 119 parallel with the spindle. The shafts 113, 116, and 119 are suitably journalled in the work head casing. The shaft 119 has an elongated fixed gear 121 which meshes at its rear portion with a spur gear 122 fixed to the spindle and at its forward portion with a spur gear 123 fixed to the cam shaft 55 above-mentioned. Through this gearing the cam shaft 55 and work spindle 48 are operated in 2 to 1 relation and the cam 46 is operated in timed relation with the rotative movement of the work spindle. These movements are automatically controlled by the electrical circuit and switch controls as described hereinafter.

Movement of the work spindle axially in the work head is effected by the cam 54' acting against a roller 124 which is supported in a fixed position on the work head as shown in Figure 19.

The work spindle is constantly urged forward (to the left viewing Figure 19) by a coil compression spring 125 of considerable compressive strength acting between a fixed shoulder 126 and a thrust collar 127 which in turn exerts the compressive force against the spindle through a thrust bearing 128. This spring 125 is of ample force to move the spindle forwardly in a feed movement of the work piece to effect the taper milling of the root edge 37 under control of the cam surface 129 on the cam 54. This axial feed of the spindle is effected simultaneously with and as a function of the described rotative feed movement of the spindle, so that the cutter simultaneously performs a surface generating milling operation and a root tapering milling operation. Obviously, by varying the shape of the cam surface 129 the shape of the taper surface may be varied. As abovementioned, a separate cam 54 is used for each milling operation and is designed to coordinate the axial feed with the surface generating feed effected by the combined rotative movement of the work spindle and the crosswise feed of the cutter under control of the cam 46. However, in the roughing milling operations such as illustrated in Figures 3, 4, and 5 the cam 54 is shaped so that its surface 129 is at all points in a plane normal to the spindle axis with the result that no axial movement of the work spindle is effected.

*Trip dog controls*

Certain operations are effected or controlled through the actuation of limit switches by means of trip dogs carried on moving parts of the machine. The first such control operation is by means of a trip dog 131, Figures 15 and 17, fixed to and depending from the rear side of the work head. This dog actuates limit switches LS1 and LS2 in a sequence of operations described below. A pair of trip dogs 132 and 133 carried on the cam 54 are positioned as shown in Figure 21—B for the first roughing operation. A similar pair of trip dogs 132' and 133' carried on the cam 54' are arranged for control functions such as used for the operations of Figures 30, 31, and 32. These trip dogs are adapted to actuate limit switches LS3 and LS4 as will be presently described. The trip dogs may be suitably mounted with provision for adjustments. For example, each dog is attached to the cam 54 by means of a T-head 134 which fits in a T-slot 135 extending around the cam so that these dogs may be set at any desired location in the slot, as shown in Figure 22.

*Cam design*

Figure 11:
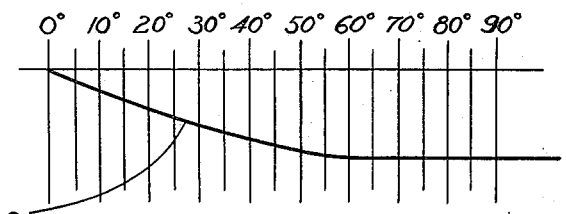
Figure 12:
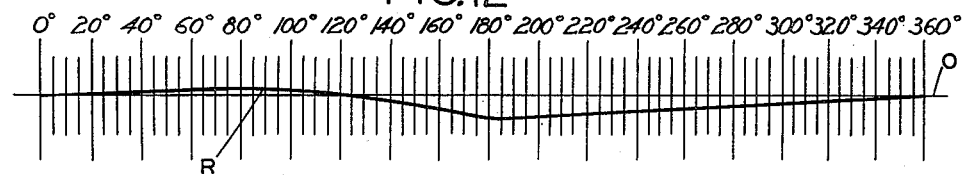
Figure 13:
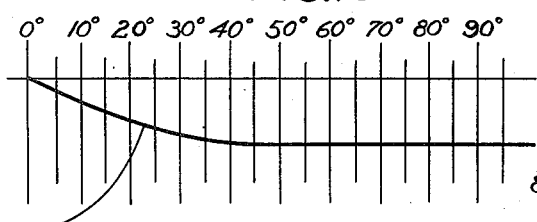
Figure 9:
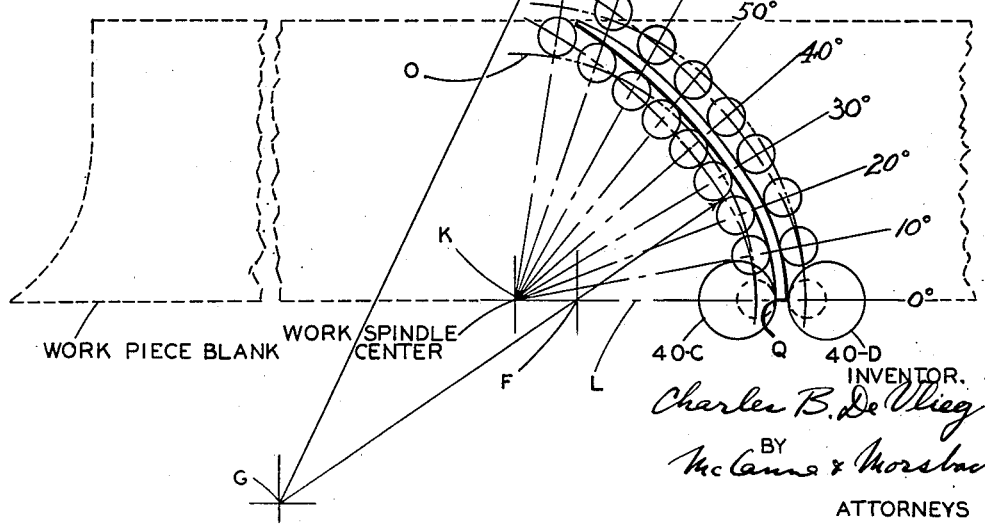
Figure 9 is a diagrammatic diagram illustrating the relative movement between the cutters and the work piece blank in the finish milling of the front and rear faces of a vane.

Referring now particularly to Figures 10, 11, 12, and 13 I have here shown diagrammatically the development of the cams which function in timed relation with the rotative feed movement of the work spindle. Each figure shows the design of a separate cam i. e., Figure 10 is of the cam 46 employed for the first roughing cut shown in Figure 3 and also for the front face finishing operation shown in Figure 6; Figure 12 is a similar cam used for the second roughing cut of Figure 5 and the rear face finishing operation shown in Figure 7; Figure 11 is the cam face 129 of the cam 54' used when performing the finish milling operation of Figure 6; and Figure 13 is a similar cam face used when performing the second roughing operation of Figure 5 and the finish milling operation of Figure 7. In these development layouts it will be noted that Figures 10 and 12 comprise 360° as compared with 90° for Figures 11 and 13, this being by reason of the 2 to 1 ratio in the timing of the cam 46 with respect to the cam 54; also, the actual working face for each cam 46 is 180° as compared with 90° for the cam 54'. According to my invention the line O in Figures 10 and 12 represents a straight line development of an imaginary arc such as an arc O struck from the center K as shown in the diagram Figure 9. Referring to Figure 10 it will be observed that the active portion of the cam surface designated generally by P represents the profile shape of the cam 46 which acts against the roller 76 and moves the cutter head horizontally on its ways in a control movement which combines with the rotative feed movement of the work piece to generate the front face of the vane. This cam surface is designed so as to transmit said crosswise feed movement of the milling cutter in one direction or the other with respect to the line O. This feed movement is combined with the rotative feed movement of the work piece so that the cutting edge or side of the cutter will produce the predetermined shape of the vane face. Thus, referring to Figure 9, it will be observed that the cutting edge Q of the cutter 40—C will feed progressively away from the arc O until in the region of 40° (80° in Figure 10) when this feed movement will progressively approach the arc O and move inwardly away from such arc at a point between 60° and 70°. By calculating the increment of this movement at uniformly spaced intervals along the arc line O, I provide a cam shape which produces the desired crosswise feed of the cutter in predetermined relation to the degree of rotative movement of the work piece at each instant of such movement. This path of the cutter 40—C is illustrated in Figure 9 at successive locations indicated by the small circle representing the smaller end of the cutter. A separate cam is provided for controlling the cutter when milling the rear face of the vane, this cam being calculated in a similar manner as illustrated in Figure 12 wherein the active cam surface R controls the movement of the milling cutter 40—D so that it traverses the path shown in Figure 9. The active cam surface S shown in Figure 11 is a development of the cam surface 129 used in this instance in the milling operation shown in Figure 6; and the active cam surface T shown in Figure 13 is the corresponding cam surface used in the milling operations of Figures 5 and 7. The cams Figures 11 and 13 are for controlling the milling function (3) above described.

Electric control equipment and its operation

Referring now more particularly to Figure 27 of the drawings, the electrical control equipment there illustrated is provided for causing the machine to produce the described sequence of operating steps in a fully automatic manner. As there shown, the three motors 44, 52 and 53 are arranged for energization from a three-phase alternating circuit source, which also acts to supply current to the control equipment through a voltage step-down transformer 143, a pair of fuse links 144 and a pair of current overload relays 145. The three motors are separately fused in the manner illustrated, the motor 52 being arranged for reverse rotary movement through selective connection of its terminals to the conductors of the power circuit. The feed motor 53 is provided with two sets of stator windings, the first set being utilized to produce slow rotation of the motor in one direction and the second set being utilized to produce high speed rotation of the motor in the reverse direction.

The control equipment for producing the desired selective energization of the motor windings comprises a group of contactors RF, CR, S, FS, FF, FPT, and RR; four limit switches LS1, LS2, LS3 and LS4, which are controlled in the manner more fully explained below in accordance with the movement of the work fixture provided in the machine; and three control switches 146, 147 and 148, the first of which is provided to initiate an operating cycle of the machine, the second of which is utilized to stop operation of all moving parts of the machine at any point in an initiated operating cycle, and the last of which is utilized to effect movement of the work fixture 49 away from the cutter after an operating cycle of the machine has been initiated.

In considering the automatic operation of the described control equipment, it may be assumed that the machine is to be used for a rough cutting operation and to that end is set up in the manner shown in Figures 14 and 15 of the drawings, except that an original work piece blank is substituted for the finished impeller wheel shown. Also, the cam 54 is provided with a flat cam face 149 rather than an inclined cam face 129, thereby to eliminate the axial feed function of the work spindle during the rough cutting operation as described above with reference to Figure 3 of the drawings. In order to start the machine, the operator momentarily depresses the button of the self-restoring start switch 146, thereby to complete a circuit through the contacts of the limit switch LS1A for energizing the windings of the two contactors RF and CR in parallel. In operating, the contactor RF closes its contacts RF2 to complete a locking circuit for itself and the contactor CR through the contacts of the limit switch LS2A. Thus, the two contactors RF and CR are held operated after the button of the start switch 146 is released by the operator, and an operating cycle of the machine is initiated.

At its contacts RF3, the relay RF, in operating, opens a point in the circuit, described below, for energizing the winding of the contactor FS. At its contacts RF1, the contactor RF connects the winding terminals of the rapid traverse motor 52 to the conductors of the power line in the correct phase relationship to produce rotation of this motor in the direction required to move the work head 47 forwardly toward the cutter spindle at the rapid traverse rate.

The contactor CR, in operating, opens its contacts CR2 further to interrupt an incomplete circuit for energizing the rapid reverse contactor RR. At its contacts CR1, the contactor CR completes an obvious circuit for energizing the spindle motor contactor S. The latter contactor, upon operating, closes a locking circuit for itself through its contacts S2, the contacts RR2 and the upper set of contacts of the return switch 148. At its contacts S3, the contactor S prepares the incomplete operating circuit for the slow feed contactor FS, this circuit being held open at the contacts RF3 of the operated contactor RF. At its contacts S1, the contactor S completes an obvious circuit for energizing the cutter drive motor 44, thereby to initiate rotation of the cutter spindle 43. Thus operation of the motor 52 to rapidly move the work head 47 toward the cutter and operation of the cutter motor 44 to rotate the cutter are initiated.

During the initial movement of the work head 47 toward the cutter, the dog 131 (Figure 15) is disengaged from the actuating arm of the limit switch LS1, permitting this self-biased switch to operate to a setting wherein the contacts LS1A are open and the contacts LS1B are closed. At the contacts LS1A, a point is opened in the above-traced operating circuit for the contactors RF and CR, thereby to render the start switch inoperative to energize these contactors until the work head 47 is again restored to its normal or start position. At the contacts LS1B, the limit switch LS1 prepares the operating circuit for the contactor RR, this circuit being held open at the break contacts CR2 of the operated contactor CR.

Movement of the work head 47 toward the cutter continues until the dog 131 carried by the work head 47 engages the actuating arm of the limit switch LS2 in a manner clearly apparent from Figure 17 of the drawings. Specifically, engagement of the dog 131 with the actuating arm of the limit switch LS2 results in opening of the contacts LS2A to deenergize the parallel connected contactors RF and CR. In releasing, the contactor RF opens at contacts RF1 to deenergize the rapid traverse motor 52 and thus terminates the forward drive of the work head. At its contacts RF2, the contactor RF opens another point in the described locking circuit for itself and the contactor CR. At its contacts RF3, the contactor RF completes a circuit through the contacts FF2, S3 and LS3A for energizing the slow feed contactor FS. The contactor CR is slow-to-release, such that it does not restore until after the contactor FS is operated. Upon restoring, it opens at contacts CR1 to interrupt the above described operating circuit for the contactor S, the latter contactor remaining energized over its locking circuit as established through the contacts S2 and the contacts of the return switch 148. At its contacts CR2 the contactor CR prepares the operating circuit for the rapid reverse contactor RR, this circuit being opened at the contacts FS2 by the contactor FS before the contactor CR restores.

When energized in the above traced circuit, the slow feed contactor FS closes its contacts FS1 to energize the feed motor 53 in a manner such that the work fixture 49 is rotated at slow speed forward into the cutter, i. e., in a clockwise direction as viewed in Figures 17, 21—A, and 29 of the drawings, it being understood that the finished impeller shown in Figure 17 is replaced by an original uncut work piece blank in the operation under consideration. From the above explanation, it will be apparent that operation of the feed motor 53 to rotate the work piece into engagement with the cutter is accomplished through the release of the contactors RF and CR followed by operation of the contactors FS, without deenergization of the cutter motor 44.

Rotation of the work fixture to produce the desired rough cutting operation in the previously described manner continues until the work fixture is rotated about 75 degrees. At this point it is noted that when the machine is set up for the operations shown in Figures 30 and 32 the work fixture upon which the work piece is supported will be rotated through the full 80 degrees illustrated in Figure 9 of the drawings, so that the cutter will be carried entirely through the work piece blank.

After the work fixture has been rotated through about 5 degrees of the described 75 degree angle, the limit switch LS4 as shown in Figure 21—A of the drawings, is de-actuated by the dog 132. In response to this operation, the contacts LS4A are closed to prepare an operating circuit for the fast feed contactor FF. Concurrently therewith the contacts LS4B of the limit switch LS4 are engaged to close another point in the operating circuit for the rapid reverse contactor RR. After the limit switch LS4 has been operated to perform the described functions, the dog 132 clears the actuating arm of the switch and dog 133 moves toward the actuating arm of the limit switch LS3. After the work piece fixture has been rotated to about 65° required in the particular rough cutting operation shown in Figure 29, the dog 133 moves the actuating arm of the limit switch LS3 to its off normal setting. In response to this operation, the contacts LS3A of the limit switch LS3 are opened to deenergize the slow feed contactor and thus arrest the operation of the feed motor 53. Thus rotation of the work fixture is terminated after this fixture has been rotated through the described 65 degree angle.

Concurrently with deenergization of the contactor FS and the feed motor 53, the contacts LS3B of the limit switch LS3 are closed to prepare the operating circuit for the fast feed reverse contactor FF. This circuit is completed at the contacts FS2 of the contactor FS incident to the release of the latter contactor, and includes the closed contacts LS4A of the limit switch LS4. In operating, the contactor FF closes its contacts FF1 to complete a circuit for energizing the high speed windings of the motor 53 with voltages of the proper phase to produce reverse rotation of this motor. Thus high speed rotation of the motor 53 to drive the work fixture back to its normal setting is initiated.

At its contacts FF2, the contactor FF also opens a point in the above described operating circuit for the slow feed contactor FS. Thus it will be noted that the two feed motor control contactors FS and FF are electrically interlocked through the provision of the contacts FS2 and FF2, respectively, so that only one thereof may be operated at a time, and hence only one set of windings of the feed motor 53 may be energized at any given instant. At its contacts FF3, the contactor FF opens a point in the incomplete operating circuit for the rapid reverse contactor RR. At its contacts FF4 the contactor FF closes an obvious locking circuit for itself.

Concurrently with energization of the contactor FF in the manner described above, the operating winding of the feed plugging timer FPT is energized in parallel with the winding of the contactor FF. This timer is nothing more than a slow-to-release contactor, being provided with a valve controlled dash pot having the function of delaying opening of the contacts FPT2 after its winding is deenergized. In operating, the timer or contactor FPT opens its contacts FPT1 and closes its contacts FPT2, all without effect at the present time.

When the fast feed reverse windings of the motor 53 are energized through operation of the contactor FF in the manner just explained, this motor functions rapidly to rotate the work fixture back to its original or start setting. During the initial portion of such reverse movement of the work fixture, the dog 133 is disengaged from the actuating arm of the limit switch LS3, thereby to effect disengagement of the contacts LS3B and reengagement of the contacts LS3A. These operations are without effect inasmuch as the contactor FF is locked out through its contacts FF4 and the operating circuit for the contactor FS is held open at the contacts FF2. During continued rotation of the work fixture toward its initial setting, and more specifically when this fixture is rotated to within 5 degrees of this setting, the dog 132 engages the actuating arm of the limit switch LS4, thereby to actuate this switch to its normal setting wherein the contacts LS4B are closed and the contacts LS4A are open.

When the contacts LS4A are opened, the contactors FF and FPT are deenergized. In releasing, the contactor FF opens its contacts FF1 to deenergize the fast feed reverse windings of the feed motor 53. By virtue of the kinetic energy stored in the moving parts being driven by the feed motor 53, however, these parts continue to rotate in the reverse direction, the carry over being sufficient to move the work fixture somewhat in excess of the 5 degrees required to restore this fixture to its normal setting. At its contacts FF4, the contactor FF opens another point in the locking circuit for itself and the contactor FPT. At its contacts FF3 the contactor FF completes a circuit through the contacts CR2, LS1B and LS4B for energizing the rapid reverse contactor RR. The latter contactor, in operating, opens its contact RR2 to deenergize the contactor S. The latter contactor in releasing, opens its contact S2 to interrupt its own locking circuit, and at its contacts S3, opens a point in the previously traced operating circuit for the contactor FS rendering the latter contactor solely controllable by the timer or dash pot contactor FPT.

As indicated above, when the limit switch LS4 is operated to deenergize the two contactors FF and FPT, the feed motor 53 is operating at high speed to return the work fixture toward its normal setting. As a matter of fact, the stored energy in the moving parts driven by this feed motor is sufficient to continue the rotation of the work fixture slightly beyond the normal or start position thereof. In order to decelerate this movement and finally stop the work fixture exactly at the desired start position, the contactor FS is energized for a short interval during the final movement of the work fixture back toward its normal position. To this end, the contactor FF in releasing, initially closes the above described operating circuit for the contactor FS. As explained above, however, this circuit is almost immediately thereafter opened at the contacts S3 incident to the release of the contactor S. It is for this reason that the timing contactor FPT is provided, this contactor acting to close its contacts FPT1, immediately its winding is deenergized and to hold its contacts FPT2 closed for a given time interval after its winding is deenergized. With these two sets of contacts closed, the contactor FS is obviously held energized independently of the setting of the contactor S. The time interval during which the contactor FS is held energized is just sufficient to permit the work fixture to be rotated slightly beyond its normal or start position and then returned exactly to this position. Shortly before this specific instant, the contacts FPT2 are opened to effect sequential deenergization of the contactor FS and the feed motor 53. Since the contactor FPT is provided with a needle valve adjustment on its dash pot, the time interval during which the contacts FPT2 are held closed following deenergization of this contactor may obviously be adjusted as desired until exact positioning of the work fixture is obtained.

When the operating arm 132 actuates the limit switch LS4 as above described, it closes the contacts of LS4B and through the contacts LS1B of limit switch LS1 (which contacts LS1B were closed by the forward movement of the work head as above described) also through contacts FF3 of the contactor FF and contacts CR2 of the contactor CR, energizes the contactor RR. At its contacts RR1, the contactor RR energizes the rapid traverse motor 52 with three-phase current which is correctly phased to cause this motor to drive the work head 47 away from the cutter back to its start position. As this movement of the work fixture is completed, the limit switch LS1 is operated to its normal setting wherein the contacts LS1A are closed and the contacts LS1B are opened. Incident to this operation, the contactor RR is obviously deenergized to effect deenergization of the rapid traverse motor 52. Following the release of the contactor RR, the control equipment is fully restored to normal in preparation for another cycle of operation.

As pointed out above, the return switch 148 is provided for controlling the equipment to return the work fixture to its start position at any time after an operating cycle of the machine is initiated. Thus assume that a cutting operation is in progress such that the two contactors S and FS and the two motors 44 and 53 are energized. Under these circumstances the limit switch LS4 may or may not be operated depending upon how far the cutting operation has progressed. Regardless of this fact, however, operation of the return switch 148 results in deenergization of the contactor S at the upper contacts of the return switch, and energization of the contactor RR, in an obvious circuit through the lower contacts of the return switch. When thus deenergized the contactor S opens its contacts S1 to deenergize the cutter motor 44. At its contacts S3, the contactor S deenergizes the contactor FS, thereby to effect deenergization of the feed motor 53. Thus operation of the two motors 43 and 53 is arrested. If the two limit switches LS3 and LS4 have not been operated at the time the switch 148 is operated, energization of the contactor RR results in operation of the rapid traverse motor 52 to return the work fixture to its normal position away from the cutter in a manner clearly apparent from the above explanation. On the other hand if the limit switch LS4 has been operated, closure of the contacts RR3 effects energization of the contactors FF and FPT, in which case the four contactors FF, FPT, FS and RR interact in the manner described above to cause the work fixture to be returned to its normal position. In any case, as the return movement of the work fixture is completed, the limit switch LS1 is operated to produce sequential deenergization of the contactor RR and the rapid traverse motor 52.

As will be evident from the preceding explanation, the stop switch 148 is provided for the purpose of arresting operation on the machine at any point in an operating cycle thereof which may have been initiated. Thus when this switch is manually operated, a common point is opened in the operating circuits for all of the contactors referred to above, causing any operated ones thereof to be released with the result that any operated ones of the three motors 43, 52 and 53 are deenergized.

When performing the second roughing milling operation shown in Figure 30, the front face finishing operation shown in Figure 31, and the rear face finishing operation shown in Figure 32, the work fixture of each machine set-up is moved in a counterclockwise direction under control of dogs 132' and 133' shown in Figure 21 and limit switches LS3 and LS4. In these cases the position of the limit switches is reversed from that shown in Figure 21—A in order to effect reversal in the direction of movements of the work fixture. It is believed that the setting of the dogs 132' and 133' and their functions will be obvious in view of the similar functions of the dogs 132 and 133. In each of the operations Figures 30, 31, and 32, the cam 54 is provided with a cam surface 129 to effect axial feed of the fixture spindle to perform the milling function (3) above described. As above-mentioned, this cam surface S shown in Figure 11 is used when finishing the front face as in Figure 31, and the surface T shown in Figure 13 is used when performing the operations of Figures 30 and 32.

I claim:

1. A method of manufacturing from a circular blank an impeller wheel having closely positioned vanes emanating from a hub portion, comprising indexing the blank about its hub center to locate each vane structure in succession at a cutting station, and performing a milling operation on each vane structure at said station by means of a rotating milling cutter positioned so that its cutting side is parallel with and laterally offset from a plane radial with respect to the blank, and further positioned at one side of the blank for milling the full radial length of the vane, and effecting continuous relative rotative movement between the axis of the rotating cutter and the blank about an axis parallel with and laterally offset from said radial plane, whereby said milling operation generates a predetermined vane surface.

2. A method of manufacturing an impeller wheel as set forth in claim 1, in which during said relative rotative movement a modifying movement is effected between the blank and the axis of the rotating cutter under control of a pattern cam.

3. A method of manufacturing an impeller wheel as set forth in claim 1, in which relative movement is effected axially of the cutter with respect to the blank simultaneously with said rotative feed movement whereby to mill a root surface of increasing depth while generating said vane curvature.

4. In the manufacture of an impeller wheel having vanes emanating from a hub portion, a method wherein a rotating spiral milling cutter is positioned with its cutting side parallel with and laterally offset from a plane radial with respect to the blank and the blank is moved rotatively about an axis parallel with and more remotely offset from said radial plane, and wherein the cutter is moved laterally in the impeller milling operation under cam control in predetermined relation to an arc struck from said axis.

5. In the manufacture of an impeller wheel having vanes emanating from a hub portion, a method wherein a tapered spiral milling cutter is positioned with its cutting side parallel with and laterally offset from a plane radial with respect to the blank and the blank is moved rotatively about an axis parallel with and more remotely offset from said radial plane, and wherein the cutter is moved laterally in the impeller milling operation under control of a cam the face of which is calculated with relation to an arc struck from said axis.

6. In the manufacture of an impeller wheel having vanes emanating from a hub portion, a method wherein a tapered spiral milling cutter is positioned with its cutting side parallel with and laterally offset from a plane radial with respect to the blank and the blank is moved rotatively about an axis parallel with and more remotely offset from said radial plane, and wherein the cutter is moved laterally in the impeller milling operation under control of a cam the face of which is calculated to effect a cutter movement which progresses by degrees of rotation of the blank and is controlled with relation to an arc struck from the axis about which the blank has rotative movement.

7. In a machine for milling an impeller wheel blank by successive milling operations to provide angularly spaced vanes emanating from a central hub portion of the blank; a base; a cutter head mounted on the base for movement crosswise thereof; a work head mounted on the base for movement lengthwise thereof toward and from the cutter head; a work fixture mounted on the head to have rotative movement thereof about a horizontal axis parallel with said movement of the work head, the work fixture having a support for a work piece blank upon which support the blank may be indexed about an axis transverse to said fixture axis and laterally offset therefrom; a rotating milling cutter carried in the cutter head with its axis in a horizontal plane and positioned with its longitudinal milling side parallel with and laterally offset from a radial plane intersecting the indexing center of the blank; means for positioning the cutter and work piece in overlapping relation with the cutter extending to the root of a vane, and imparting relative rotative movement to the work fixture about its said center whereby to generate a vane surface of predetermined configuration at cross sections throughout the length of the vane.

8. In a machine for milling an impeller wheel blank by successive milling operations to provide angularly spaced vanes emanating from a central hub portion of the blank; a base; a cutter head mounted on the base for movement crosswise thereof and equipped with a rotatable milling cutter on a horizontal axis extending lengthwise of the base; a work head mounted on the base for movement horizontally lengthwise thereof toward and from the cutter head and equipped with a spindle mounted for rotative movement in the head about a horizontal axis extending lengthwise of the base and equipped with an indexing work fixture adapted for carrying an impeller wheel blank at the end of the spindle adjacent to the cutter, the impeller wheel blank being indexable to successively position each vane body at a station for milling; means for imparting rotative movement to the work spindle when each vane body is positioned at said station during which to move the blank in an arcuate path for performance of a vane milling operation; means for rotating the milling cutter; and means for moving the tool head crosswise on the base in timed relation with each said rotative movement of the spindle and in response to a cam action designed to combine said crosswise movement of the cutter with said arcuate movement of the work spindle to generate an impeller face of predetermined shape.

9. In a machine for milling an impeller wheel blank by successive milling operations to provide closely positioned vanes emanating from a central hub portion of the blank, in combination, a work head having a work carrying spindle mounted for rotative movement about the spindle axis, a work fixture on one end of the spindle on which the impeller wheel blank is adapted to be indexed about an axis transverse to the spindle axis to successively position vane bodies at a milling station, a tool head having a milling cutter on an axis substantially parallel with the spindle axis in one plane and in angular relation to said axis in a plane at right angles to the first mentioned plane, the spindle axis being laterally offset from the vane body at said milling station, means for relatively moving the work head and tool head to locate the work piece and the cutter in overlapping relation, means for rotatively moving the work piece about the spindle axis in a feed movement wherein the cutter mills a predetermined surface, and means operated in timed relation with said rotative feed movement of the work piece to move the cutter crosswise of its axis in a predetermined relation to the rotative feed movement of the work piece whereby the combined crosswise movement of the milling cutter combined with the rotative movement of the work piece generates a predetermined surface.

10. A milling machine as set forth in claim 9, plus means responsive to the rotation of said spindle for producing relative movement between the cutter and the work piece lengthwise of the spindle axis and simultaneously with said rotative feed movement whereby to extend said generated surface to produce a tapered hub configuration.

11. A method of manufacturing an impeller wheel as set forth in claim 1, in which the described milling operation is performed on the front face of the vane structures by a milling cutter rotating in a direction for climb milling said front face, and in which a milling cutter located at the side of the vane structure opposite from said axis for milling the rear face of the vane structure is rotated in a direction for climb milling said rear face.

12. A method of manufacturing an impeller wheel as set forth in claim 1, in which the described milling operation is performed by rough milling the front face of a vane structure, rough milling the rear face thereof, finish milling the front face thereof, and finish milling the rear face thereof, and in each such milling operation causing the milling cutter to be rotated in a direction with respect to the relative rotative movement between the cutter and the blank to effect climb milling.

13. A method of manufacturing from a circular blank an impeller wheel having a central hub, each vane having opposed faces converging outwardly with relation to a vane center line which is radial to the center of the blank, consisting in milling each face by locating a milling cutter and the blank in such relative relation that the cutting face of the milling cutter for milling one face is in a plane parallel with and laterally offset from a plane radial to the blank and is similarly laterally offset from the opposite side of said radial plane for milling the opposite face, the location of said cutting face line being determined by the formula:

$$\frac{1}{2}t + \left(\tan\frac{\theta}{2} \times R\right)$$

where the thickness of the tip of the vane is designated by $t$, the distance of said tip from the center by $R$, and the included angle of the taper of the vane by theta $(\theta)$.

14. In a machine for milling an impeller wheel blank by successive milling operations to provide closely positioned vanes emanating from a central hub portion of the blank; a base; a cutter head mounted on the base for movement crosswise thereof and equipped with a rotatable milling cutter on a horizontal axis extending lengthwise of the base; a work head mounted on the base for movement horizontally lengthwise thereof toward and from the cutter head and equipped with a spindle mounted for rotative movement in the head about a horizontal axis extending lengthwise of the base and equipped with a work fixture adapted for carrying an impeller wheel blank at the end of the spindle adjacent to the cutter; motor means for imparting rotative movement to the work spindle during which to move the blank in an arcuate path for performance of a milling operation; means for rotating the milling cutter; means for traversing the work head lengthwise of the base to bring the impeller wheel blank into and out of operative relation with the cutter; and control means responsive to forward movement of the work head to cause said operation of the work spindle motor means in one direction and responsive to said rotative movement to cause reverse rotative movement of said spindle.

15. In a machine for milling an impeller wheel blank by successive milling operations to provide angularly spaced vanes emanating from a central hub portion of the blank; a base; a cutter head mounted on the base for movement crosswise thereof and equipped with a rotatable milling cutter on a horizontal axis extending lengthwise of the base; a work head mounted on the base for movement horizontally lengthwise thereof toward and from the cutter head and equipped with a spindle mounted for rotative movement in the head about a horizontal axis extending lengthwise of the base and equipped with a work fixture adapted for carrying an impeller wheel blank at the end of the spindle adjacent to the cutter; motor means for imparting rotative movement to the work spindle during which to move the blank in an arcuate path for performance of a milling operation; means for rotating the milling cutter; and means coacting between the work spindle and the work head designed to impart axial movement to the spindle with respect to the work head in response to rotative movement of the spindle whereby to combine with the described milling operation a milling of the root portion of the vane structure to produce a tapered hub form according to the design of said cam means.

16. Apparatus of the character described comprising, in combination, a bed, a cutter head mounted for movement crosswise on the bed and equipped with a high speed cutter spindle on an axis extending lengthwise of the bed, a work head mounted for movement lengthwise on the bed and equipped with a work spindle on an axis extending lengthwise of the bed, a work fixture on the end of the work spindle adjacent to the cutter head, a tapered spiral milling cutter on the end of the cutter spindle adjacent to the work fixture, means for traversing the work head on the bed to position a work piece carried on the work fixture in cutting relation with the cutter, means for rotatively moving the work spindle about its axis in feed and return movements, means including a cam control operated in timed relation to the rotative movement of the work spindle to move the cutter head crosswise whereby the combined rotative feed of the work spindle and the crosswise cam controlled movement of the cutter spindle produce a milling cut of predetermined surface contour, a motor on the cutter head for driving the cutter spindle, a motor for driving the work head traversing means, a motor on the work head for driving the work spindle feed means, and control mechanism for operating said motors in a cycle of operations comprising operation of the work head traversing motor, means responsive to forward movement of the work head to put the cutter spindle motor into operation and to put the spindle feed motor into operation, and means responsive to rotative movement of the work spindle to return the work spindle to a starting position and to also return the work head to a starting position.

17. Apparatus of the character described comprising, in combination, a bed, a cutter head mounted for movement crosswise on the bed and equipped with a high speed cutter spindle on an axis extending lengthwise of the bed, a work head mounted for movement lengthwise on the bed and equipped with a work spindle on an axis extending lengthwise of the bed, a work fixture on the end of the work spindle adjacent to the cutter head, a tapered spiral milling cutter on the end of the cutter spindle adjacent to the work fixture, means for traversing the work head on the bed to position a work piece carried on the work fixture in cutting relation with the cutter, means for rotatively moving the work spindle about its axis in feed and return movements, means including a cam control operated in timed relation to the rotative movement of the work spindle to move the cutter head crosswise whereby the combined rotative feed of the work spindle and the crosswise cam controlled movement of the cutter spindle produce a milling cut of predetermined surface contour, and a cam on the end of the work spindle opposite from the work fixture and coacting with a roller mounted in a stationary position on the work head, the cam shaped to move the work spindle axially in its mounting in the work head as a function of the described rotative feed movement of the work head whereby to impart controlled movement to the work piece axially of the work spindle simultaneously and in timed relation with said rotative feed movement.

18. Apparatus of the character described comprising, in combination, a bed, a cutter head mounted for movement crosswise on the bed and equipped with a high speed cutter spindle on an axis extending lengthwise of the bed, a work head mounted for movement lengthwise on the bed and equipped with a work spindle on an axis extending lengthwise of the bed, a work fixture on the end of the work spindle adjacent to the cutter head, a tapered spiral milling cutter on the end of the cutter spindle adjacent to the work fixture, means for traversing the work head on the bed to position a work piece carried on the work fixture in cutting relation with the cutter, means for rotatively moving the work spindle about its axis in feed and return movements, means including a cam control operated in timed relation to the rotative movement of the work spindle to move the cutter head crosswise whereby the combined rotative feed of the work spindle and the crosswise cam controlled movement of the cutter spindle produce a milling cut of predetermined surface contour, the base being provided with a rigid stationary stop block having a bevel stop face and the work head being provided with a stop block having a bevel stop face complementary to that on the stationary stop block and arranged to be brought into wedging engagement with said stationary stop face upon traverse of the work head to its forward position.

19. A method of manufacturing from a circular blank an impeller wheel having circumferentially spaced vanes emanating from a hub portion and having an inlet side and an outlet side, compriisng indexing the blank about its hub axis for locating the vane structure in succession at a cutting station, positioning a rotating milling cutter on an axis substantially coplanar with the outlet side of the blank and disposed with its cutting side parallel to and laterally offset from a radial plane of the blank, effecting relative rotative movements between the axis of the rotating cutter and the blank about an axis substantially coplanar with said outlet side of the blank and parallel with and laterally outset from said radial plane, and concurrently effecting relatively linear movement between the axis of the rotating cutter and the blank in the plane of said outlet side of the blank and laterally with respect to the cutter axis, said last-mentioned movement being accomplished in timed relationship with said rotative movement, thereby generating a vane face of predetermined contour.

20. The method of machining a predetermined generated surface on a work piece, said method being performed by a plurality of coordinated relative movements between the work piece and a rotating cutter, the cutter being moved relative to the work piece continuously in a climb cutting operation without back-lash while the work piece is being simultaneously moved in a plurality of coordinated movements.

21. The method of manufacturing an impeller vane from a blank which comprises initially positioning a rotating milling cutter with its cutting side parallel with and laterally offset from a reference plane, initially positioning the blank with respect to said reference plane so that the desired radial axis of the impeller vane to be produced lies in said reference plane, said cutter being further positioned relative to said blank to overlie said blank at least to the extent of the full radial length of a desired vane, producing relative rotative movement between the cutter and the blank about an axis parallel with and laterally offset from said reference plane, and concurrently relatively shifting said cutter and said blank linearly in a direction transverse to the axis of said cutter in timed relation to said relative rotation, thereby engaging said cutter with said blank and forming on said blank a vane surface of varying curvature in one relative traverse of the rotating cutter and the blank.

22. The method of manufacturing an impeller vane from a blank which comprises initially positioning a rotating spiral milling cutter with its cutting side parallel with and laterally offset from a reference plane, initially positioning the blank with respect to said reference plane so that the desired radial axis of the impeller vane to be produced lies in said reference plane, said cutter being further positioned relative to said blank to overlie said blank at least to the extent of the full radial length of a desired vane, producing relative rotative movement between the cutter and the blank about an axis parallel with and laterally offset from said reference plane, concurrently relatively shifting said cutter and said blank linearly in a direction transverse to the axis of said cutter in timed relation to said relative rotation, thereby engaging said cutter with said blank and forming on said blank a vane surface of varying curvature in one relative traverse of the rotating cutter and the blank, and concurrently relatively shifting said cutter and said blank linearly in a direction parallel to the axis of said cutter in timed relation to said relative rotation, thereby producing a varying radial length of said vane surface.

CHARLES B. DE VLIEG.

REFERENCES CITED

The following references are of record in the file of this patent:

UNITED STATES PATENTS

| Number | Name | Date |
| --- | --- | --- |
| 531,817 | Warren | Jan. 1, 1895 |
| 627,299 | Echols | June 20, 1899 |
| 1,346,928 | Wright | July 20, 1920 |
| 1,422,850 | Gruenberg | July 18, 1922 |
| 1,515,568 | Fleming | Nov. 11, 1924 |
| 1,863,570 | Lees | June 21, 1932 |
| 1,959,703 | Birmann | May 22, 1934 |
| 2,116,181 | Bauer | May 3, 1938 |
| 2,326,847 | Fanning | Aug. 17, 1943 |
| 2,392,606 | Maddox | Jan. 8, 1946 |